United States Patent [19]

Beaufort et al.

[11] Patent Number: 4,970,528

[45] **Date of Patent: * Nov. 13, 1990**

[54] METHOD FOR UNIFORMLY DRYING INK ON PAPER FROM AN INK JET PRINTER

[75] Inventors: Richard F. Beaufort, Boise; Paul R. Spencer, Meridian, both of Id.

[73] Assignee: Hewlett-Packard Company, Palo Alto, Calif.

[ * ] Notice: The portion of the term of this patent subsequent to May 3, 2005 has been disclaimed.

[21] Appl. No.: 266,198

[22] Filed: Nov. 2, 1988

[51] Int. Cl.[5] .............................................. G01D 9/00

[52] U.S. Cl. ...................................... 346/25; 346/1.1; 346/140 R; 219/200

[58] Field of Search ...................... 346/25, 140 R, 1.1; 219/200

[56] References Cited

U.S. PATENT DOCUMENTS 4,774,523 9/1988 Beaufort et al. ...................... 346/25

*Primary Examiner*—Mark J. Reinhart

[57] ABSTRACT

Disclosed herein is a uniform heat flux dryer system and method of an ink jet printer, including a 180° contoured paper transport path for transferring paper from an input paper supply tray to an output paper collection tray. During this transfer, the paper receives a uniform heat flux from an infrared bulb which is located at the axis of symmetry for the paper transport path, and reflectors are positioned on each side of the infrared bulb to maximize heat transmission from the bulb to the paper during the ink drying process. Advantageously, the input and output paper trays may be vertically aligned on one side of the printer to facilitate loading and unloading of the paper.

1 Claim, 2 Drawing Sheets

METHOD FOR UNIFORMLY DRYING INK ON PAPER FROM AN INK JET PRINTER

TECHNICAL FIELD

This invention relates generally to ink jet printing and more particularly to an improved ink jet printer having a constant heat flux evaporative dryer. This dryer provides uniform drying of ink on paper and is economical in construction.

BACKGROUND ART

In the past, paper output from an ink jet printer was either allowed to dry naturally without any special heating or drying schemes, or it was heated in a non-uniform manner, usually with a drying system which was not directly a part of the ink jet printer. See for example U.S. Pat. Nos. 4,095,234 and 4,501,072 for examples of non-uniform paper drying systems. In the case of the natural drying method, there is normally insufficient time elapse between ink printing and paper stacking or the like, thereby causing ink smearing to occur. In known non-uniform heating and drying systems, the non-uniform heat flux into the paper often produce hot spots in the paper, and this drying non-uniformity requires some type of compensation treatment for either the paper or the paper handling system or both.

DISCLOSURE OF INVENTION

The general purpose of this invention is to provide a new and improved paper handling and ink drying apparatus which is part of an ink jet printer, and an associated method of drying paper which overcomes the above disadvantages of the prior art. To accomplish this purpose, we provide an omnidirectional source of heat adjacent the paper exit path of an ink jet printer and then radiate that heat to an approximate 180° contoured area with respect to the location of the heat source. Paper from an ink jet printer is passed over this 180° contoured area as it exits the ink jet printer and moves toward a paper receiving and stacking area. In a preferred embodiment of the invention, the movement of the paper over the 180° contoured area is achieved by providing a semi-cylindrical contoured heat reflector which is an integral part of an ink jet printer apparatus and which provides an output paper path for such apparatus. In this manner, printed paper is fed along the interior 180° contoured surface area of the heat reflector as it passes from the print area of the ink jet printer and then to an output paper collection area for such printer.

Accordingly, an object of this invention is to provide a new and improved ink jet printer which is elegantly straightforward in construction, reliable in operation and economical in manufacture.

Another object is to provide an improved ink drying apparatus of the type described which is easily integrated into the output paper handling system for an ink jet printer.

A novel feature of this invention is the provision of an ink drying system for the printer which is an integral and multi-functional part of the paper handling system, and is of compact construction.

Another feature of this invention is the provision of a novel geometrical configuration for the ink drying system which insures uniform heating and drying of the paper.

Another feature of this invention is the provision of an ink drying system in which paper routing and paper drying are simultaneously provided in a thermal ink jet printer.

The above objects, advantages and other novel features of this invention will become more readily apparent in the following description of the accompanying drawings.

BEST MODE FOR CARRYING OUT THE INVENTION

Figure 1:
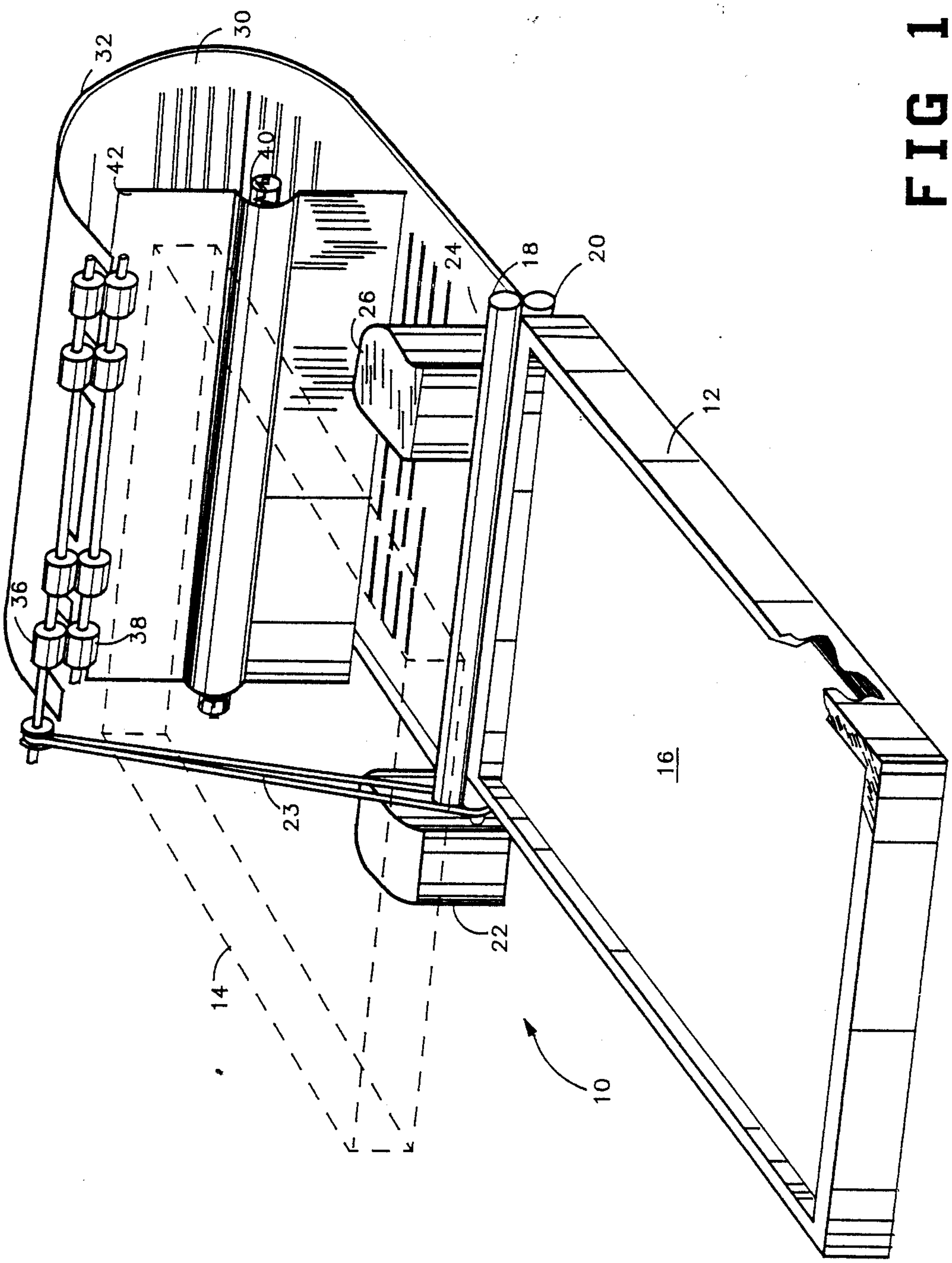
FIG. 1 is a schematic isometric view of an ink jet printer apparatus according to the invention and showing the 180° contoured drying area at the end of the printer.

Referring now to FIG. 1, there is shown an ink jet printer which is designated generally 10 and includes an input paper collection tray 12 of rectangular construction and mounted on the front side of the printer 10. The input paper collection tray 12 is vertically aligned as shown with an output paper collection tray 14 to facilitate the front loading and front removal of both the unprinted and printed paper, respectively, from the printer 10.

The paper 16 in the input paper tray 12 is fed between a pair of pinch drive rollers 18 and 20 which are driven by a motor 22 located as shown on the left hand side of the printer. The motor 22 drives a belt 23 which is connected to drive the horizontal shafts for both upper and lower sets of drive rollers as described herein in order to move the sheets of paper from the input tray 12 to the output tray 14 during an ink jet printing operation. The sheets of paper 16 are driven past the pinch drive rollers 18 and 20 and into a print area 24 beneath an ink jet printhead 26 located on the right side of the printer.

The ink jet paper tray 12, the drive rollers 18 and 20, the printhead 26, and the paper drive motor 22 are of conventional construction well known to those skilled in the thermal ink jet and related printing arts. These components are therefore shown schematically in the drawings and for sake of simplicity are not described in mechanical detail herein. However, for a further discussion of some of the mechanical construction details of paper drive means and associated transport mechanisms for an ink jet printhead, reference may be made to copending application Ser. No. 024,278 of Steven O. Rasmussen et al entitled "LOW COST THERMAL INK JET PRINTER", assigned to the present assignee and incorporated herein by reference. Also, for a further discussion of many other aspects of thermal ink jet technology, reference may be made to the *Hewlett Packard Journal*, Vol. 36, No. 5, May 1985, also incorporated herein by reference.

Figure 2:
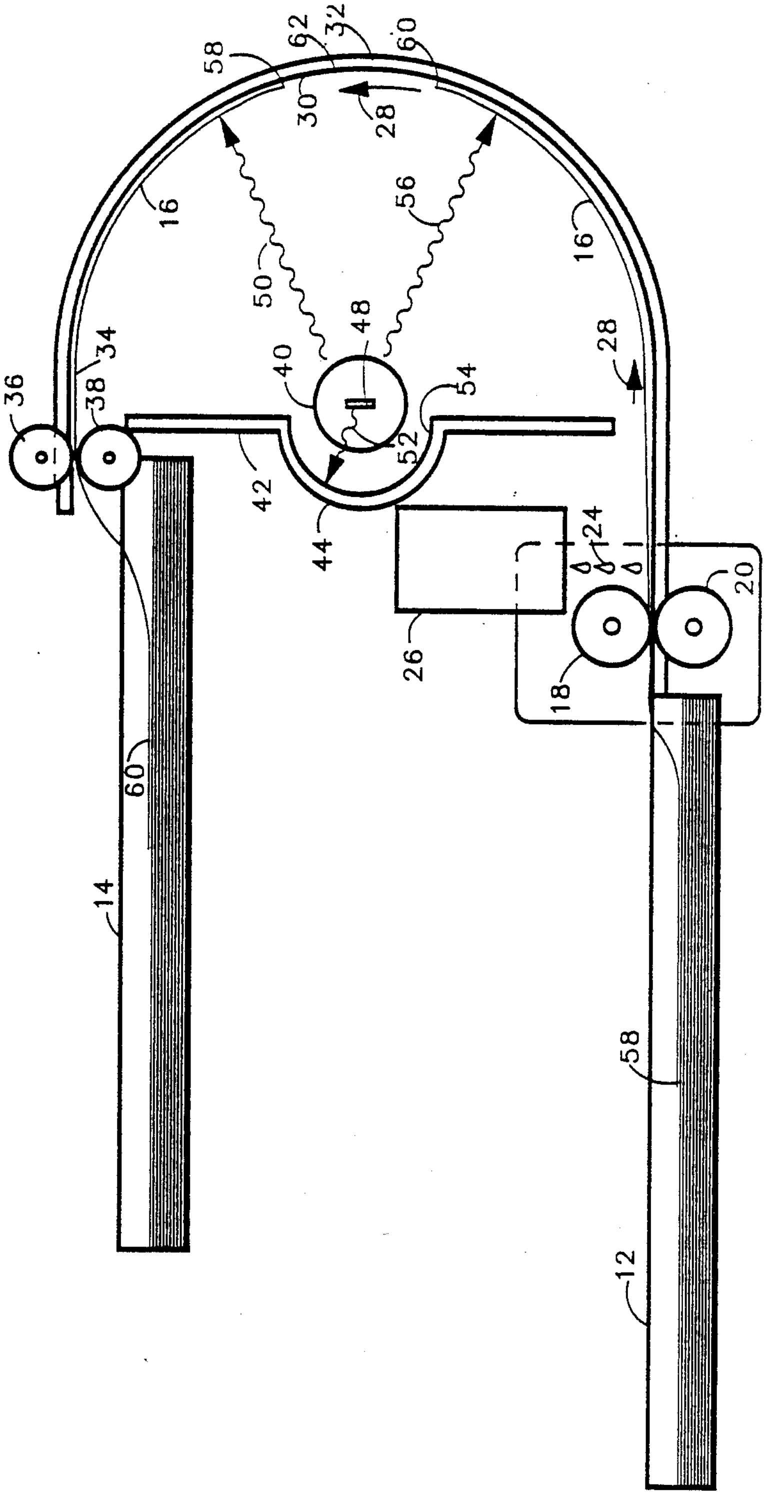
FIG. 2 is an elevation view looking into the right hand side of FIG. 1 and showing paper movement from the input tray to the output tray.

Referring now to FIG. 2, this elevation view shows by arrows 28 the path of paper movement as it exits the print area 24 beneath the ink jet printhead 26. This path extends along the inner contoured semi-cylindrical surface area 30 of a first or outer heat reflector 32. The paper path 28 continues to the uppermost region 34 of the heat reflector 32 and passes through a pair of output drive rollers 36 and 38 and into the output paper collection tray 14.

The paper drying system and apparatus of the present invention further includes an elongated infrared heat source 40 which is positioned as shown adjacent a second or inner heat reflector 42. The inner heat reflector 42 includes an elongated trough portion 44 which has its longitudinal axis of symmetry coincident with the longitudinal central axis of the elongated infrared bulb 40. The flat surface 46 of the inner reflector 42 lies in the same plane which contains the central axis of the infrared bulb 40, whose typical bulb diameter is between 0.25 and 0.375 inches. The bulb 40 has a filament 48 which extends along the central axis of the bulb 40, and the length of the bulb 40 is approximately nine (9) inches, or slightly wider than the width of the paper 16. The tungsten filament 48 is designed to emit a uniform heat flux from end to end and is supported in an evacuated quartz tube. The spacing from the filament 48 to the second reflector 44 will typically be between ½ and 2 inches. This infrared heater device 40 may be obtained from the General Electric Company of Schenectady, N.Y.

The reflectors 32 and 42 are fabricated of aluminum and are treated so as to have highly polished aluminum inside surfaces. These reflectors are also slightly wider than the width of the paper 16, or approximately nine (9) inches for a typical width of 8.5 inches for the paper 16. Typically, the distance from the filament 48 to the outer reflector 32 is in the range of 1.5 to 3.5 inches, or comparable to the actual distances shown in FIG. 2 of the drawings.

The infrared and visible radiation 50 from the filament 48 is transmitted from the right hand surface of the bulb 40 and directly through the paper 16, then to the interior surface 30 of the reflector 32 and then back through the paper 16. For infrared radiation 52 transmitted from the left hand surface of the bulb 40, the transmission path is from the filament 48 and directly to the semi-cylindrical surface 54 of the trough portion 44 of the reflector 42. This radiation 52 is then reflected back over its direct transmission path and passes directly as reflected radiation 56 in a direction as shown to the interior surface 30 of the first reflector 32.

The heat flux from the infrared bulb 40 will vary typically from zero up to 40 joules per square inch at the reflector 32, and these values correspond to a paper speed ranging from zero to 2 inches per second. The general relationship between the power input to the bulb filament 48 and the speed of the paper is established by the product of the power density, P, at the paper and the ink drying time, T. This product is equal to a constant at a constant humidity. Thus, if it takes 30 watts per square inch to dry the print in one (1) second, then it will take approximately 4.2 watts per square inch to dry the print in seven (7) seconds.

The paper entering the dryer as indicated by the lower arrow 28 will follow the semi-cylindrical contour of the inner surface 30 of the first or outer reflector 32. The dynamic friction between the leading edge 60 of the paper 16 and the reflector 32 causes the paper to follow this contour along an approximate 180° surface path and to the output rollers 36 and 38 as indicated. The paper 16 which is ejected from the rollers 18 and 20 is sufficiently stiff so as to force the leading edge 60 of the paper 16 against the reflector surface 30 and hold it against this surface 30 during its motion along the 180° path as indicated. When the paper 16 is stacked in the output collection tray 14, it is stacked face down in the correct order with page 1 followed by page 2 by page 3 and so on.

The drive rollers 18 and 20 are typically made of urethane, whereas the drive rollers 36 and 38 are usually fabricated from silicone rubber because of the heat of the paper leaving the drying area.

In accordance with one advantage of the present invention, the per page processing speed was increased from 2 minutes per page using no dryer at all to 13 seconds per page using the uniform dryer described and claimed herein. This feature represents a speed performance increase of 923%. Using non-uniform drying techniques in the prior art, it has been possible to increase paper drying times to only approximately 30 seconds per page. This latter maximum attainable speed was limited by the fact that browning of paper occurred on paper jams (due to hot spots) where correspondingly higher non-uniform elevated temperatures were attempted in order to further increase the paper transport speed.

The axis of symmetry of the interior semi-cylindrical surface 30 of the first reflector 32 is also the longitudinal axis of the infrared filament 48. Thus, all direct radiation 50 emitted by the filament 48 and absorbed by the paper 16 travels over a constant radius from the infrared bulb 40 to the paper 16. Therefore, the heat flux 50 at the paper surface is uniform. On the other hand, the reflected radiation 52 which is transmitted first to the curved inner surface 54 of the reflective trough 44 is reflected off of this surface and travels a longer, but also constant, radius and produces a real image of the direct radiation pattern at the filament 48. This reflected radiation then follows the same radiation path as the path of the direct radiation 50. Thus, both the direct and reflected radiation from the IR bulb 40 produce a uniform heat flux over the 180° contoured inner surface area 30 over which the paper 16 travels along the path 28 and to the output paper collection tray 14.

Typically, the size and spacing of the various components of the printer are such that the trailing edge 58 of a cut sheet of paper 16 will be about half way out of the input tray 12 as its leading edge 60 is approaching the half way point 62 around the 180° contoured paper path 30. These trailing and leading edges 58 and 60 are also shown for the sheet of paper 16 as it continues its upward movement counterclockwise along the inner contoured surface 30 and through the output drive rollers 36 and 38 and into the output collection tray 14. In this fashion, the drying surface area may be minimized while insuring that the paper 16 is received by the output rollers 36 and 38 before leaving control of the input drive rollers 18 and 20.

Thus, there has been described a novel and extremely useful uniform paper drying method and apparatus for an ink jet printer. This apparatus is elegantly simple in construction and is particularly adapted for integration into conventional ink jet printing systems. Furthermore, this method and apparatus are reliable in the uniform paper drying operation, and such apparatus is economical to manufacture relative to some of the mechanically complex prior art paper handling and drying systems.

Various modifications may be made in the construction and operation of the above described embodiment without departing from the scope of this invention. For example, the materials and the exact shapes, sizes and geometries of the various components comprising the constant heat flux dryer may be changed and/or modified by those skilled in the art within the scope of the following appended claim.

We claim:

1. A method for loading, uniformly drying, and then unloading in sequence ink jet paper in an ink jet printer comprising the steps of:

a. stacking paper on one side of an ink jet printer, b. moving said paper from said one side and around an approximate 180° path and back to the said one side of said printer while simultaneously, c. radiating heat uniformly to said paper as it moves over said approximate 180° path to uniformly dry said paper, and d. stacking the dried paper on the same side of the printer as the unprinted loaded ink jet paper, whereby uniform paper drying is achieved during 180° paper transport from input to output paper trays of an ink jet printer.

* * * * *